US006654753B1

(12) United States Patent
Arda et al.

(10) Patent No.: US 6,654,753 B1
(45) Date of Patent: Nov. 25, 2003

(54) COMBINATION ASSOCIATIVE AND DIRECTED GRAPH REPRESENTATION OF COMMAND STRUCTURES

(75) Inventors: Priyadarshini Arda, Austin, TX (US); Ryan McVeigh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/408,988

(22) Filed: Sep. 29, 1999

(51) Int. Cl.[7] .................................................. G06F 7/00
(52) U.S. Cl. ....................................... 707/100; 709/316
(58) Field of Search ............................. 707/100–104.1; 709/310–332, 238

(56) References Cited

U.S. PATENT DOCUMENTS

| | | | |
|---|---|---|---|
| 5,245,699 A | * | 9/1993 | Ono ............................ 706/48 |
| 5,353,412 A | | 10/1994 | Douglas et al. |
| 5,509,006 A | | 4/1996 | Wilford et al. |
| 5,509,123 A | | 4/1996 | Dobbins et al. |
| 5,557,796 A | | 9/1996 | Fehskens et al. |
| 5,615,363 A | * | 3/1997 | Jenness ....................... 707/103 |
| 5,673,369 A | * | 9/1997 | Kim ............................ 706/59 |
| 5,692,184 A | * | 11/1997 | Ardoin et al. .............. 707/103 |
| 5,701,484 A | | 12/1997 | Artsy |
| 5,758,159 A | | 5/1998 | Collet |
| 5,778,178 A | | 7/1998 | Arunachalam |
| 5,812,779 A | | 9/1998 | Ciscon et al. |
| 5,822,585 A | | 10/1998 | Noble et al. |
| 5,832,219 A | | 11/1998 | Pettus |
| 5,881,246 A | | 3/1999 | Crawley et al. |

\* cited by examiner

Primary Examiner—John Follansbee
Assistant Examiner—Van H. Nguyen
(74) Attorney, Agent, or Firm—Leslie A. Van Leeuwen; Bracewell & Patterson, L.L.P.

(57) ABSTRACT

A system and method of providing, using, and traversing a combination associative and directed graph that is used for traversing command structures that are representative of a command that is communicated from at least one system to at least another system. The combination associative and directed graph has a directed graph portion that is used for traversing hierarchical command structures and has an associative graph portion for traversing associative command structures. Data is provided for defining the directed graph portion. The directed graph portion is used for representing and traversing the command structures that have a relationship to each other or that have a hierarchical nature. The data that defines the directed graph portion is coupled to and below the command. Data is provided for defining the associative graph portion. The associative graph portion is used for representing and traversing the command structures that each have a named role or that have an associative nature. The data defining the associative graph portion is coupled to and below the command via a coupling component within the associative graph portion that is referenced by the directed graph portion. This coupling component is a terminal component. The system and method involves the determination of whether the command has at least one directive graph command structure that requires traversing the directive graph portion or at least one associative graph command that requires traversing the associative graph portion and the traversal of the respective graph portion.

26 Claims, 4 Drawing Sheets

COMBINATION ASSOCIATIVE AND DIRECTED GRAPH REPRESENTATION OF COMMAND STRUCTURES

BACKGROUND OF THE INVENTION

1. Technical Field

The present invention relates in general to a graph representation of command structures and traversing the graph representation when a command is communicated from at least one system to at least another system and in particular to a combination associative and directed graph representation of command structures and traversing the combination associative and directed graph when a command is communicated from at least one system to at least another system.

2. Description of the Related Art

A computer command (i.e. a request or a response to a request) is represented by computer command structures. These command structures are modeled by graph representations. The two most common command structures are the associative graph representation and the directed graph representation.

The associative graph representation relates components via associations or named roles. The associations are coupled with a named role. For example, a terminal feature is related to the terminal file list by an association role file list. The association that contains the association role file list provides the relation of the terminal feature to the terminal file list.

The directed graph representation contain references to the objects to which they are related. The components have a relationship to each other, and they are structured in a hierarchy in this directed graph representation. The components have a knowledge of their immediate "parent" as well as references to their "children".

When a command is sent from one system to another system in which the one system is different from the other system, simulation of information between the two systems is needed. The command structures of the command, therefore, needs to be determined and traversed in order to send and process the command from the one system to the other system. Presently, either the directed graph representation or the associative graph representation is used to send and process a command from one system to another system. The use of either one of the graph representations presents the limitations that some of the command structures are not able to be simulated (i.e. either can process only associative command structures or only directive command structures), or the command processing involves the use and switching between the associative and directive graph representations, which can be very time consuming, tedious, and cumbersome processes and involve the use of more software and hardware.

However, a command may very well have command structures that are both represented by an associative graph(s) and a directed graph(s), but the problem exists in that no such graph representation exists to handle command structures with both an associative graph representation(s) and a directed graph representation(s).

It is therefore advantageous and desirable to provide a system and method of providing a combination associative and directed graph that is used for traversing command structures that are representative of a command that is communicated from at least one system to at least another system. It is further advantageous and desirable to provide a combination associative and directed graph that is used for traversing command structures that are representative of a command wherein the combination graph overcomes limitations and problems of prior art, such as the problem of some command structures not being able to be simulated (i.e. either can process only associative command structures or only directive command structures) or the problem that the command processing uses and switches between an associative graph and a directed graph. It is also advantageous and desirable to provide a combination associative and directed graph that involves a process that is less time consuming, tedious, and cumbersome and that uses less software and hardware. It is still also advantageous and desirable to provide a method of traversing a combination associative and directed graph that is representative of command structures of a command that is communicated from at least one system to at least another system wherein the combination associative and directed graph has a directed graph portion that is used for traversing hierarchical command structures and has an associative graph portion for traversing associative command structures.

SUMMARY OF THE INVENTION

It is therefore one object of the present invention to provide a system and method of providing a combination associative and directed graph that is used for traversing command structures that are representative of a command that is communicated from at least one system to at least another system.

It is another object of the present invention to provide a combination associative and directed graph that is used for traversing command structures that are representative of a command wherein the combination graph overcomes limitations and problems of prior art, such as the problem of some command structures not being able to be simulated (i.e. either can process only associative command structures or only directive command structures) or the problem that the command processing uses and switches between an associative graph and a directed graph.

It is a further object of the present invention to provide a combination associative and directed graph that involves a process that is less time consuming, tedious, and cumbersome and that uses less software and hardware.

It is still a further object of the present invention to provide a method of traversing a combination associative and directed graph that is representative of command structures of a command that is communicated from at least one system to at least another system wherein the combination associative and directed graph has a directed graph portion that is used for traversing hierarchical command structures and has an associative graph portion for traversing associative command structures.

The foregoing objects are achieved as is now described. A system and method of providing, using, and traversing a combination associative and directed graph that is used for traversing command structures that are representative of a command that is communicated from at least one system to at least another system. The combination associative and directed graph has a directed graph portion that is used for traversing hierarchical command structures and has an associative graph portion for traversing associative command structures. Data is provided for defining the directed graph portion. The directed graph portion is used for representing and traversing the command structures that have a relationship to each other or that have a hierarchical nature. The data that defines the directed graph portion is coupled to and below the command. Data is provided for defining the associative graph portion. The associative graph portion is used for representing and traversing the command structures that each have a named role or that have an associative nature. The data defining the associative graph portion is coupled to and below the command via a coupling component within the associative graph portion that is referenced by the directed graph portion. This coupling component is a terminal component. The system and method involves the determination of whether the command has at least one directive graph command structure that requires traversing the directive graph portion or at least one associative graph command that requires traversing the associative graph portion and the traversal of the respective graph portion.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention provides a system and method of providing a combination associative and directed graph that is used for traversing command structures that are representative of a command that is communicated from at least one system to at least another system. The combination associative and directed graph is used for traversing command structures that are representative of a command wherein the combination graph overcomes limitations and problems of prior art, such as the problem of some command structures not being able to be simulated (i.e. either can process only associative command structures or only directive command structures) or the problem that the command processing uses and switches between an associative graph and a directed graph. The combination associative and directed graph involves a process that is less time consuming, tedious, and cumbersome and that uses less software and hardware. The combination associative and directed graph has a directed graph portion that is used for traversing hierarchical command structures and has an associative graph portion for traversing associative command structures.

Figure 1:
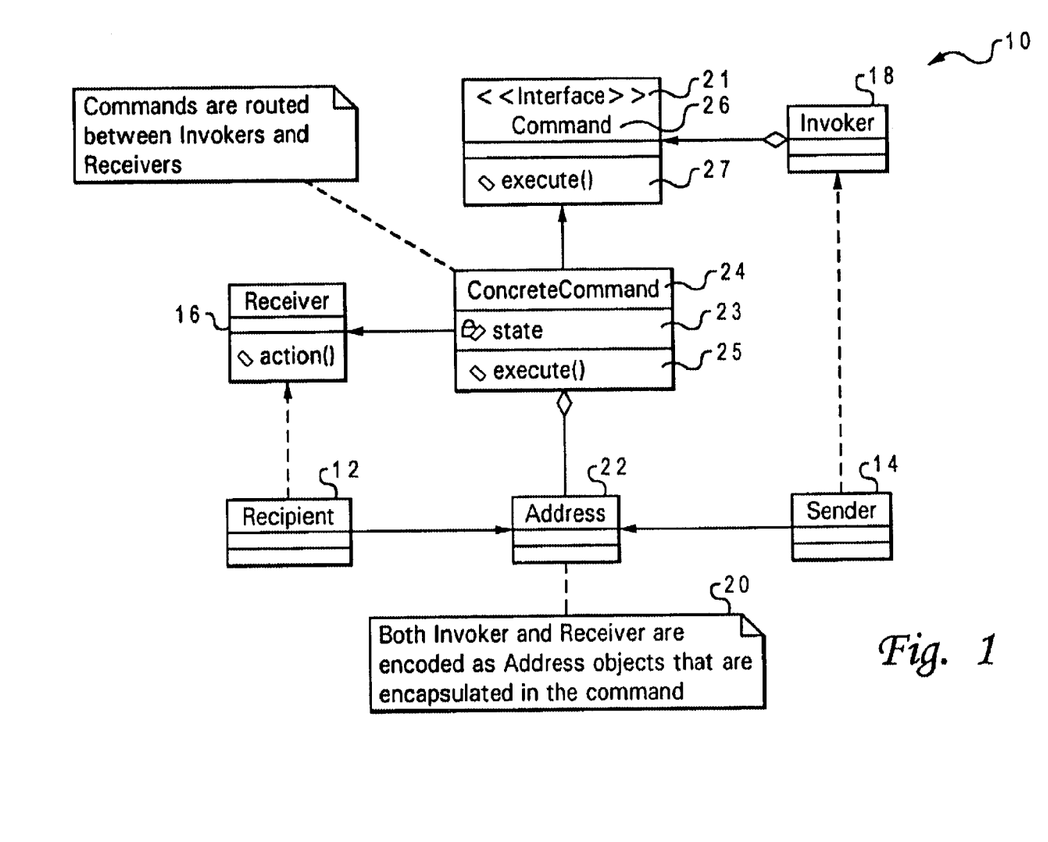
FIG. 1 is a block diagram of the system for providing a combination associative and directed graph used for traversing. command structures that are representative of a command.

With reference now to the figures and in particular with reference to FIG. 1, a system 10 for providing a combination associative and directed graph that is used for traversing command structures that are representative of a command 26 is shown. The system 10 generally comprises at least one sender or sending system 14 for sending the command 26 and at least one recipient or receiving system 12 for receiving the command 26. An invoker(s) 18 is shown coupled to the sender(s) or sending system(s) 14 while a receiver(s) 16 is shown coupled to the recipient(s) or receiving system(s) 12. The commands 26 are routed between the invoker(s) 18 and the receiver(s) 16.

The command 26 is shown at the top of the system 10. The command 26 has an execute status 27. The concrete command 24 is coupled to the command 26, and it has a state 23 and an execute status 25. The command 26 is a generic command object while the concrete command 24 is a specific command object. The concrete command 24 is an instance of the generic command object. The invoker 18 and the receiver 16 are encoded as address objects at box 20, and they are encapsulated in the command at address box 22. An interface 21 couples the command between the sender(s) or sending system(s) 14 and the recipient(s) or receiving system(s) 12. The interface 21 allows traversal of the command structures (i.e. concrete command 24 with state 23 and execute status 25) to communicate the command 26 between the sender(s) or sending system(s) 14 and the recipient(s) or receiving system(s) 12.

Data is provided at the interface 21 for defining a directed graph portion that is used for representing and traversing the command structures that have a relationship to each other. The data defining the directed graph portion is coupled to and below the command. Data is also provided at the interface for defining an associative graph portion that is used for representing and traversing the command structures that each have a named role, and the data defining the associative graph portion is coupled to and below the command via a coupling component within the associative graph portion that is referenced by the directed graph portion.

One implementation of the present invention is the ADX API. The ADX API has been designed to communicate CIM Instance information between subsystems. A user is able to create an associative graph of the CIM instance information and is able to create a directed graph to support command creation and traversal. ADX is a JAVA implementation. A CIM instance is an instance of a definition class.

Figure 2:
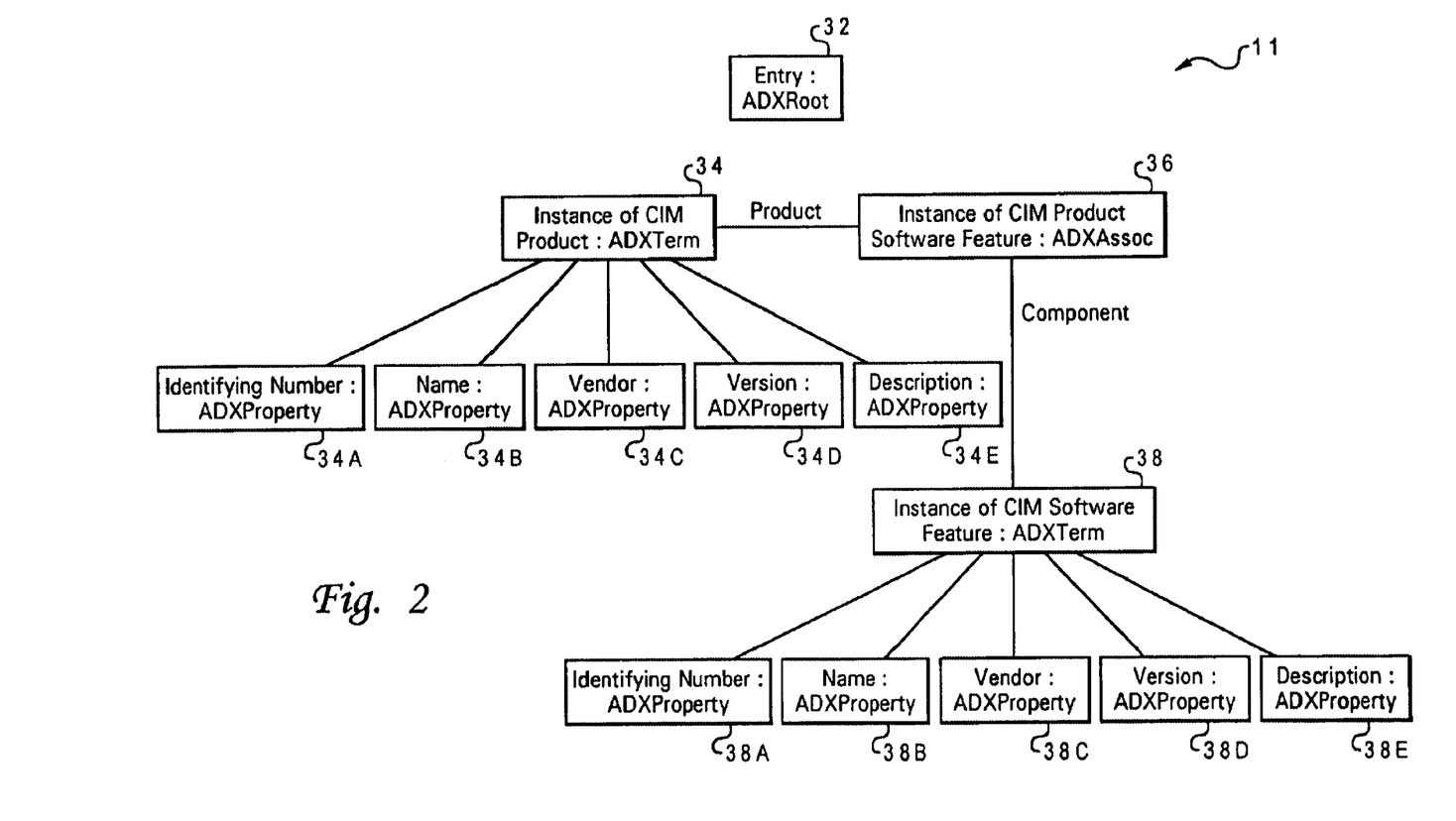
FIG. 2 is a general block diagram of an ADX representation of CIM instances.

With reference now to the figures and in particular with reference to FIG. 2, a block diagram 11 of an ADX representation of CIM instances is shown. The entry ADXRoot is shown at block 32. Instance of CIM at the product side is shown at block 34. An ADXTerm for a terminal on the product side is shown at block 34. Instance of CIM at the software feature side is shown at block 38. An ADXTerm for a terminal on the software feature side is shown at block 34. An ADXAssoc block 36 associates the instance of CIM product block 34 with the instance of CIM software feature block 38.

Several ADXProperty blocks identifying the various properties of the CIM product block 34 exist underneath the instance of CIM product block 34. These CIM product blocks are the identifying number block 34A, the name block 34B, the vendor block 34C, the version block 34D, and the description block 34E. Several ADXProperty blocks identifying the various properties of the CIM software feature block 38 exist underneath the instance of CIM software feature block 38. These CIM software feature blocks are also the identifying number block 38A, the name block 38B, the vendor block 38C, the version block 38D, and the description block 38E.

Figure 3:
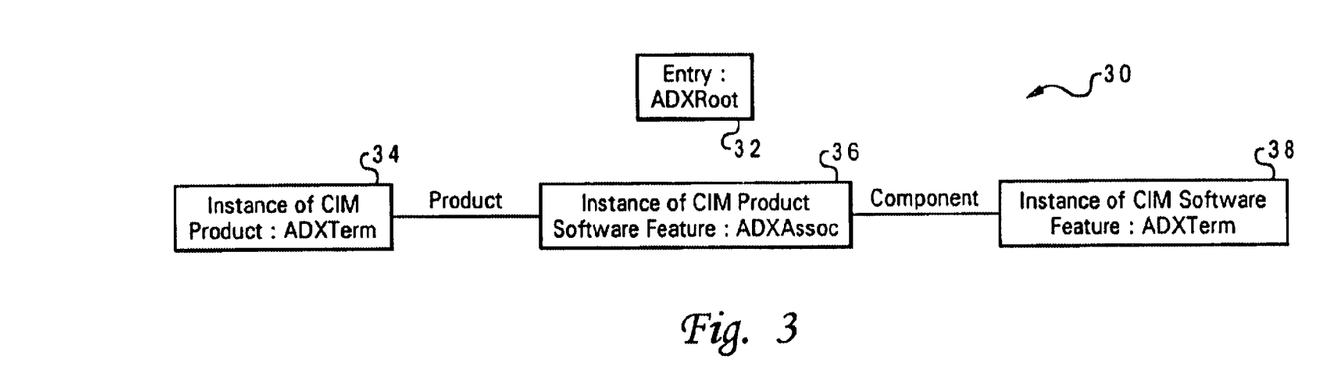
FIG. 3 is a block diagram of an associative ADX graph created by the system of FIG. 1 wherein the associative graph is used for traversing a command.
Figure 4:
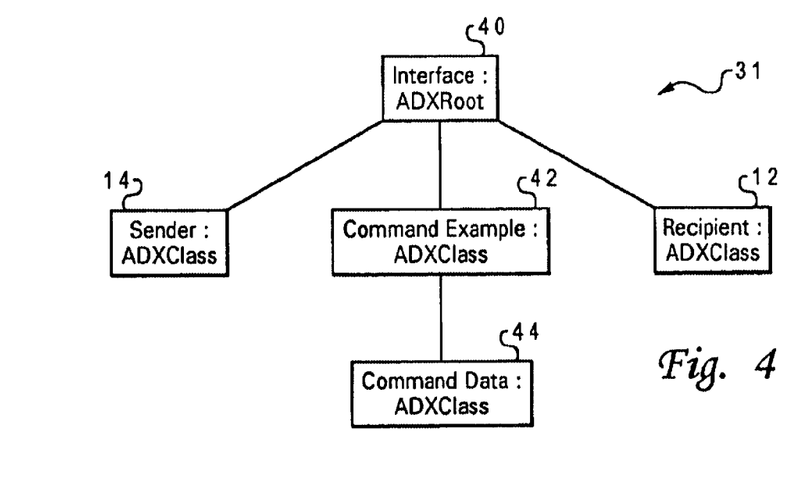
FIG. 4 is a block diagram of a directed ADX graph created by the system of FIG. 1 wherein the directed graph is used for traversing a command.
Figure 5:
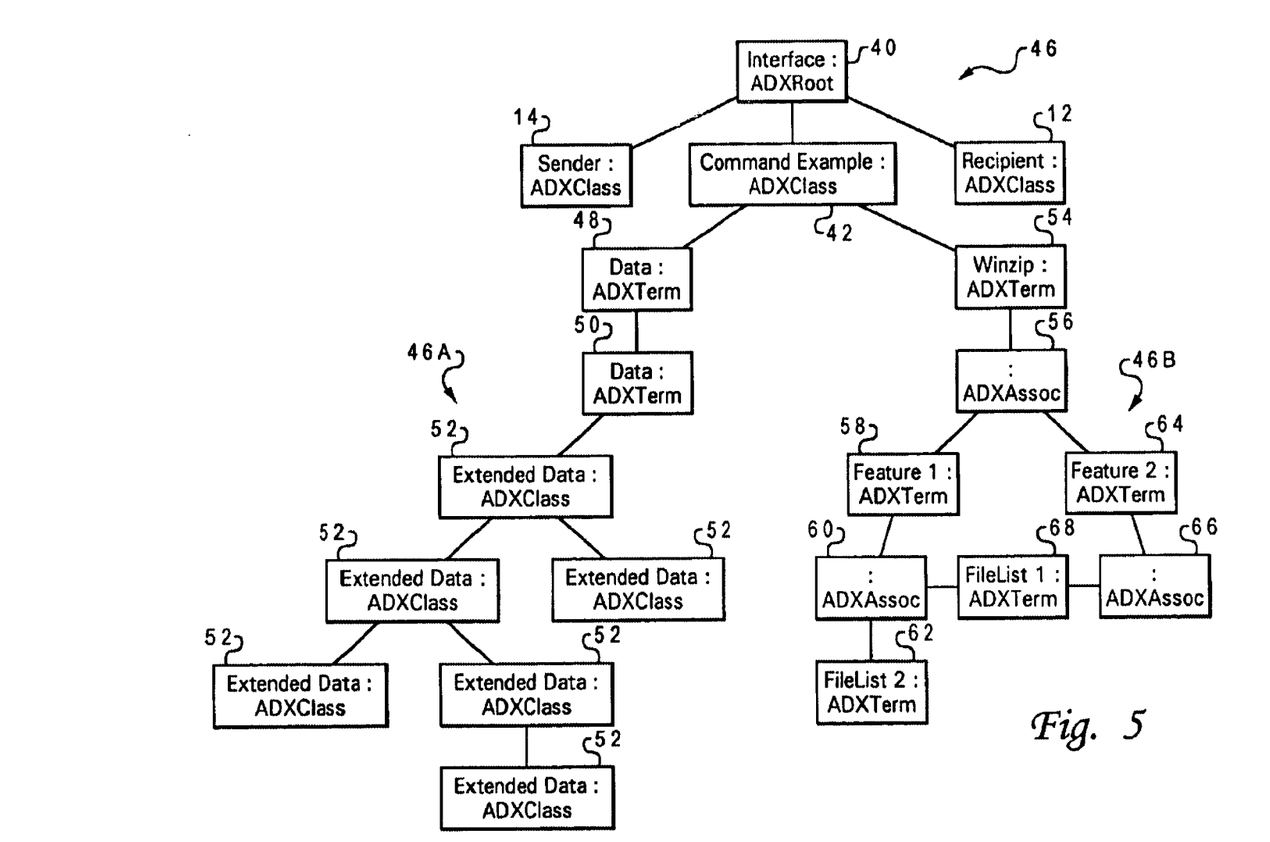
FIG. 5 is a block diagram of a mixed or combination associative and directed ADX graph created by the system of FIG. 1 wherein the combination graph is used for traversing a command.

With reference now to the figures and in particular With reference to FIGS. 3, 4, and 5, the system 10 for providing a combination associative and directed graph is capable of respectively creating and traversing an associative ADX graph, a directed ADX graph, and/or a mixed associative and directed ADX graph, that are used to process and route commands between a sender or sending system 14 to a recipient or receiving system 12. The fact that the system 10 is able to create and traverse any one of the three graphs for processing and routing commands results in a command routing process that is less time consuming, less tedious, and less cumbersome and that also uses less software and hardware.

With reference now to the figures and in particular with reference to FIG. 3, a block diagram 30 for creating associative ADX graphs by the system 10 is shown. The block diagram 30 shows an entry ADX root 32. The ADXTerm block 34 provides a terminal for the instance of CIM product on the product side. The ADXTerm block 38 provides a terminal for the instance of CIM software feature on the software feature side. The ADXAssoc block 36 associates the ADXTerm block 34 on the product side with the ADXTerm 38 on the software feature side. In this example, the block of code may be defined as: ADXRoot=new ADXRoot( ); ADXTerm product=new ADXTerm( ); ADXTerm feature=new ADXTerm( ); ADXAssoc assoc=new ADXTerm( ). The ADXTerm 34 (i.e. product terminal) is added to the graph using a root product terminal add command while the ADXTerm 38 (i.e. software feature terminal) is added to the graph using a root software feature terminal add command. Furthermore, the ADXAssoc 36 is added to the graph using an add association command. An add product role command is used to link the product (i.e. ADXTerm 34) to the association (i.e. ADXAssoc 36) while an add software feature role command is used to link the software feature (i.e. ADXTerm 38) to the association (i.e. ADXAssoc 36). The associations are linked to the terminals via the add role call or command on the association. The terminal is also updated when this call or command is made.

With reference now to the figures and in particular with reference to FIG. 4, a block diagram 31 for creating directed ADX graphs by the system 10 is shown. The block diagram 31 shows an interface ADXRoot 40. The sender or sending system 14 defined by an ADXClass is coupled to the interface ADXRoot 40:on one side, and the recipient or receiving system 12 defined by an ADXClass is coupled to the interface ADXRoot 40 on another side. A command example 42 is defined by an ADXClass, and it is shown below and located at the interface 40. The command example 42 comprises command data 44 that defines the command structure(s) of the command example 42. The command data block 44 is shown below and coupled to the command example block 42. In this example, the block of code may be defined as: ADXRoot root=new ADXRoot( );
 ADXClass command=new ADXClass( ); ADXClass senderAddress=new ADXClass( ); ADXClass recipientAddress=new ADXClass( ); ADXClass commandData =new ADXClass( ). A root link command is used to link the root to the command. A root sender link command is used to link the root 40 to the sender address of the sender 16 while a root recipient link command is used to link the root 40 to the recipient address of the recipient 12. A command data link command is used to link the command 42 to the command data 44. The ADXClass objects and their derivatives are linked together via the addClass( ) method on the ADXRoot object. This linkage provides the serialization capability as well as the ability to traverse between these objects.

With reference now to the figures and in particular with reference to FIG. 5, a block diagram 46 for creating a combination or mixed associative and directed ADX graph by the system 10 is shown. The top of block diagram 46 shows similar features to the directed ADX graph 31. An interface ADXRoot 40 exists at the top of the block diagram 46. The sender or sending system 14 defined by an ADXClass is coupled to the interface ADXRoot 40 on one side, and the recipient or receiving system 12 defined by an ADXClass is coupled to the interface ADXRoot 40 on another side. A command example 42 is defined by an ADXClass, and it is shown below and located at the interface 40. However, below this command example 42, the left side of the block diagram 46 shows the directed graph portion 46A, and the right side of the block diagram 46 shows the associative graph portion 46B.

On the directed graph portion 46A, ADXTerm blocks 48 and 50 defining the terminals for the command data are hierarchically coupled from the command example block 42. From block 50, a series of extended command data blocks 52 defined by ADXClasses are coupled therefrom. These extended command data blocks 52 are coupled in a hierarchical structure as well. On the associative graph portion 46B, an ADXTerm block 54 defining a Winzip file that relates the ADXTerm object to the command example block 42 is coupled from the command example block 42. An ADXAssoc block 56 is coupled from the ADXTerm block 54. Software feature 1 block 58 is defined as a terminal (i.e an ADXTerm), and software feature 2 block 64 is also defined as a terminal (i.e. an ADXTerm). An ADX Assoc block 60 is used to couple the software feature 1 block 58 to a file list 1 block 68 that is defined by a terminal (i.e. ADXTerm) and to a file list 2 block 62 that is also defined by a terminal (i.e. ADXTerm). An ADX Assoc block 66 is used to couple the software feature 2 block 64 to the file list 1 block 68.

The block diagram 46 shows the mixed or combination associative and directed graph wherein this graph generally has a directed graph portion 46A and an associative graph portion 46B attached beneath the command 42. This graph uses the addClass( ) method on the ADXRoot to relate the ADXTerm object (Winzip on the associative graph portion 46B) to the command example block 42 using a root add Winzip class command. In order to create the associative graph objects, the addTerm( ) and add-Asso) methods are used on the ADXRoot object when building mixed style or combination graphs. However, this method is not necessary for the "Winzip terminal" since the root has knowledge about this object from the addClass( ) call or command. If a set of objects is to be added that are related only in a directed manner (i.e. the additemo method was called to connect them), then this addition is achieved by using an add root directed graph command wherein the command adds a new graph to "parent" and begins with an object called "child".

Thus, the system 10 implements a method of providing a combination associative and directed graph 46 that is used for traversing command structures that are representative of a command 42 that is communicated from at least one sender or sending system 14 to at least another recipient or receiving system 12. Data (i.e. in blocks 48, 50, and 52) is/are provided for defining the directed graph portion 46A. The directed graph portion 46A is used for representing and traversing the command structures that have a relationship to each other or that have a hierarchical nature. The data that defines the directed graph portion 46A is coupled to and below the command 42. Data (i.e. in blocks 58, 62, 64, and 68) is/are provided for defining the associative graph portion 46B. The associative graph portion 46B is used for representing and traversing the command structures that each have a named role or that have an associative nature. The data defining the associative graph portion 46B is coupled to and below the command via a coupling component (i.e. Winzip block 54 and ADXAssoc block 56 that are coupled to the command 42) within the associative graph portion 46B that is referenced by the directed graph portion 46A. This coupling component is an association component or a terminal component.

The method of implementing and using the system 10 further involves the determination of whether the command 42 has at least one directive graph command structure that requires traversing the directive graph portion 46B. The directive graph portion 46B for the at least one directive graph command structure is traversed in communicating the command from the at least one sender or sending system 14 to the at least another recipient or receiving system 12 if it is determined that the command 42 has the at least one directive graph command structure. Furthermore, the method of implementing and using the system 12 also involves the determination of whether the command 42 has at least one associative graph command structure that requires traversing the associative graph portion 46C. The associative graph portion 46C for the at least one associative graph command structure is traversed in communicating the command 42 from the at least one sender or sending system 14 to the at least another recipient or receiving system 12 if it is determined that the command 42 has the at least one associative graph command structure.

In reference to the directed graph portion 46A, terminal data (at blocks 48 and 50) relating to the at least one sender or sending system 14 and the at least another recipient or receiving system 12 are provided. Class objects and derivative objects from the class objects are used and provided wherein the class objects and the derivative objects have data relating to the command 42 that has the command structures in a hierarchy. The class objects and the derivative objects are coupled to and below the terminal data. A list of the class objects and the derivative objects is provided. The list is hierarchically traversed, and the class objects and the derivative objects that are related to the command are accessed. The data relating to the command structures from the class objects and the derivative objects that are related to the command 42 is obtained.

In reference to the associative graph portion 46B, terminal data relating to the at least one sender or sending system 14 and the at least another recipient or receiving system 12 is provided. Association data (i.e. at blocks 58, 62, 64, and 68) is provided wherein the association data has data relating to the command structures of the command 42 in the associative nature and has features associated to each other for the command structures of the command 42. The association data is coupled to and below the terminal data. An association role file list provides associations and relationships of the association data and the features therein to each other. A terminal file list that receives the associations and the relationships of the association data and the features sent from the association role file list that are related to the command is provided. The association role file list and the terminal file list are used to allow traversal of the associative graph portion.

In reference to the directed graph portion 46A in moving between ADXClass objects and their derivatives, the public ADXClass obtains list items such as class, class object, string property, and string value. The public interval count list items such as the class and class object. The public enumeration of obtain list items involves class and class object. The public enumeration of remove list items involves class and class object. The public void add item involves ADXItem and Item. The public ADXItem of remove item involves ADXItem and Item. The public enumeration of obtain items is executed, and the public void of remove all items is executed. The public ADXItem for obtain parent command is executed, and the public ADXItem for obtain top parent is executed. The public void set parent for ADXItem and parent is also executed.

In reference to the associative graph portion 46B in moving between terminals and associations, the ADXTerm involves the public enumeration obtaining the associations and the string names. The ADXTerm also involves the public void respectively adding and removing associations based on ADXAssoc commands. The ADXAssoc involves the public void adding roles such as the string name and the ADXTerm terminal and removing roles such as the string names. The ADXAssoc involves public enumeration of obtaining roles. Also, the public ADXTerm obtains roles such as the string name.

The method of traversing a combination associative and directed graph that is representative of command structures of a command 42 is discussed. The command 42 is communicated from at least one sender or sending system 14 to at least another recipient or receiving system 12. The combination associative and directed graph has a directed graph portion 46A that is used for traversing hierarchical command structures and has an associative graph portion 46B for traversing associative command structures.

Data is provided for defining the directed graph portion 46A that is used for representing and traversing the hierarchical command structures. The data is coupled to define the directed graph portion 46A to and below the command 42. Data is provided for defining the associative graph portion 46B that is used for representing and traversing the associative command structures. The data defining the associative graph portion is coupled to and below the command 42. The traversing method determines whether the command has at least one directive graph command structure that requires traversing the directive graph portion 46A. If the method determines that the command 42 has the at least one directive graph command structure, then the directive graph portion 46A is traversed for the at least one directive graph command structure in communicating the command 42 from the at least one sender or sending system 14 to the at least another recipient or receiving system 12. The traversing method also determines whether the command 42 has at least one associative graph command structure that requires traversing the associative graph portion 46B. If the method determines that the command 42 has at least one associative graph command structure, then the associative graph portion 46B is traversed for the at least one associative graph command structure in communicating the command 42 from the at least one sender or sending system 14 to the at least another recipient or receiving system 12.

In traversing the directive graph portion 46A, the method also involves the data that is provided for defining the directed graph portion 46A that is used for representing and traversing the at least one directive graph command structure. Terminal data relating is provided to the at least one sender or sending system 14 and the at least another recipient or receiving system 12. Class objects and derivative objects from the class objects are provided wherein the class objects and the derivative objects have data relating to the at least one directive graph command structure. The class objects and the derivative objects are coupled to and below the terminal data. A list of the class objects and the derivative objects is provided. The list is a hierarchically traversed. The class objects and the derivative objects that are related to the command 42 are accessed. The data relating to the command structures is obtained from the class objects and the derivative objects that are related to the command 42.

In traversing the associative graph portion 46B, data is provided defining the associative graph portion 46B that is used for representing and traversing the at least one associative graph command structure. Terminal data is provided relating to the at least one sender or sending system 14 and the at least another recipient or receiving system 12. Association data is provided wherein the association data has data relating to the at least one associative graph command structure and has features associated to each other for the at least one associative graph command structure. The association data is coupled to and below the terminal data. An association role file list provides associations and relationship of the association data and the features therein to each other. A terminal file list that receives the associations and the relationships of the association data and the features sent from the association role file list that are related to the command 42 is provided. The association role file list and the terminal file list are used to allow traversal of the associative graph portion 46B.

While the invention has been particularly shown and described with reference to a preferred embodiment, it will be understood by those skilled in the art that various changes in form and detail may be made therein without departing from the spirit and scope of the invention.

What is claimed is:

1. A method of providing a combination associative and directed graph that is used for traversing command structures that are representative of a command that is communicated from at least one system to at least another system comprising the steps of:
   providing data defining a directed graph portion that is used for representing and traversing the command structures that have a relationship to each other,
   coupling the data defining the directed graph portion to and below the command,
   providing data defining an associative graph portion that is used for representing and traversing the command structures that each have a named role, and
   coupling the data defining the associative graph portion to and below the command via a coupling component within the associative graph portion that is referenced by the directed graph portion.

2. The method according to claim 1, wherein the step of providing data defining a directed graph portion further comprises the step of:
   providing data defining the directed graph portion that is used for representing and traversing the command structures that have a hierarchical nature.

3. The method according to claim 2, wherein said step of providing data defining said directed graph portion comprises:
   providing terminal data relating to the at least one system and the at least another system,
   providing class objects and derivative objects from the class objects, wherein the class objects and the derivative objects have data relating to the command structures in a hierarchy,
   providing a list of the class objects and the derivative objects, said method further comprises:
      hierarchically traversing the list and accessing the class objects and the derivative objects that are related to the command, and
      obtaining the data relating to the command structures from the class objects and the derivative objects that are related to the command.

4. The method according to claim 1, wherein the step of providing data defining an associative graph portion further comprises the step of:
   providing data defining the associative graph portion that is used for representing and traversing the command structures that have an associative nature.

5. The method according to claim 4, wherein said step of providing data defining said associative graph portion comprises:
   providing terminal data relating to the at least one system and the at least another system,
      providing association data relating to the command structures having an associative nature and has features associated with the command structures,
   providing an association role file list for providing associations and relationships of the association data and the features therein to each other,
   providing a terminal file list that receives the associations and the relationships of the association data and the features sent from the association role file list that are related to the command, and
   said method further comprises using the association role file list and the terminal file list to allow traversal of the associative graph portion.

6. The method according to claim 1, further comprising:
   determining whether the command has at least one directed graph command structure that requires traversing the directed graph portion,
   traversing the directed graph portion for the at least one directed graph command structure in communicating the command from the at least one system to the at least another system if it is determined that the command has the at least one directed graph command structure,
   determining whether the command has at least one associative graph command structure that requires, traversing the associative graph portion, and
   traversing the associative graph portion for the at least one associative graph command structure in communicating the command from the at least one system to the at least another system if it is determined that the command has the at least one associative graph command structure.

7. The method according to claim 6, wherein the step of traversing the directed graph portion comprises:
   hierarchically traversing the list and accessing the class objects and the derivative objects that are related to the command, and
   obtaining the data relating to the command structures from the class objects and the derivative objects that are related to the command.

8. The method according to claim 6, wherein the step of traversing the associative graph portion further comprises:
   using the association role file list and the terminal file list to traverse the associative graph portion.

9. The method according to claim 1, wherein the coupling component is an association component.

10. The method according to claim 1, wherein the coupling component is a terminal component.

11. A system for providing a combination associative and directed graph that is used for traversing command structures that are representative of a command, said system comprising:

an interface for coupling the system and at least another system to allow traversal of the command structures to communicate the command there between, means for providing data at the interface that defines a directed graph portion of the combination associative and directed graph that is used for representing and traversing the command structures that have a relationship to each other, wherein the data defining the directed graph portion are coupled to and below the command, and means for providing data at the interface that defines an associative graph portion of the combination associative and directed graph that is used for representing and traversing the command structures that each have a named role, wherein the data defining the associative graph portion are coupled to and below the command via a coupling component within the associative graph portion that referenced by the directed graph portion.

12. The system according to claim 11, wherein the command structures that have a relationship to each other are command structures that have a hierarchical relationship.

13. The system according to claim 12, wherein said data defining the directed graph portion includes:

terminal data relating to the system and the at least another system, class objects and derivative objects from the class objects coupled to and below the terminal data, wherein the class objects and the derivative objects have data relating to the hierarchically related command structures, and a list of the class objects and the derivative objects, wherein the list is hierarchically traversed to access the class objects and the derivative objects that are related to the command, wherein the data relating to the command structures are obtained from the class objects and the derivative objects related to the command.

14. The system according to claim 11, wherein the command structures that each have a named role are associative command structures.

15. The system according to claim 14, wherein said data defining the associative graph portion includes:

terminal data relating to the system and the at least another system is provided at the interface, association data, coupled to and below the terminal data, relating to the associative command structures, an association role file list that provides associations and relationships of the association data and the features therein to each other, and a terminal file list that receives the associations and the relationships of the association data and the features sent from the association role file list that are related to the command, wherein the association role file list and the terminal file list are used to traverse the associative graph portion.

16. The system according to claim 11, further comprising:

a determination system at the interface for determining whether the command has at least one directed graph command structure that requires traversing the directed graph portion and for determining whether the command has at least one associative graph command structure that requires traversing the associative graph portion, wherein the determination system directs traversing of the directed graph portion for the at least one directed graph command structure in communicating the command from the at least one system to the at least another system if it is determined the command has the at least one directed graph command structure, and wherein the determination system directs traversing of the associative graph portion for the at least one associative graph command structure in communicating the command from the at least one system to the at least another system if it is determined the command has the at least one associative graph command structure.

17. The system according to claim 16, wherein the determination system comprises:

data for defining the directed graph portion that is used for representing and traversing the at least one directed graph command structure, terminal data relating to the system and the at least another system, class objects and derivative objects from the class objects coupled to and below the terminal data, wherein the class objects and the derivative objects have data relating to the at least one directed graph command structure, a list of the class objects and the derivative objects, that is hierarchically traversed to access the class objects and the derivative objects related to the command, and wherein the data relating to the command structures is obtained from the class objects and the derivative objects that are related to the command.

18. The system according to claim 16, wherein the determination system comprises:

data defining the associative graph portion that is used for representing and traversing the at least one associative graph command structure, terminal data relating to the system and the at least another system, association data relating to the at least one associative graph command structure and having features associated with the at least one associative graph command structure, an association role file list providing associations and relationships of the association data and the features therein to each other, a terminal file list that receives the associations and the relationships of the association data and the features sent from the association role file list that are related to the command, and wherein the association role file list and the terminal file list are used to traverse the associative graph portion.

19. The system according to claim 11, wherein the coupling component is an association component.

20. The system according to claim 11, wherein the coupling component is a terminal component.

21. A method of traversing a combination associative and directed graph that is representative of command structures of a command that is communicated from at least one system to at least another system, wherein the combination associative and directed graph has a directed graph portion that is used for traversing hierarchical command structures and has an associative graph portion for traversing associative command structures, each of the directed graph portion and said associative graph portion being coupled to and below the command, said method comprising:

determining whether the command has at least one directed graph command structure that requires traversing the directed graph portion,     traversing the directed graph portion for the at least one directed graph command structure in communicating the command from the at least one system to the at least another system if it is determined that the command has the at least one directed graph command structure,     determining whether the command has at least one associative graph command structure that requires traversing the associative graph portion, and     traversing the associative graph portion for the at least one associative graph command structure in communicating the command from the at least one system to the at least another system if it is determined that the command has at least one associative graph command structure.

22. The method according to claim 21, wherein the step of traversing the directed graph portion comprises:

hierarchically traversing the list and accessing the class objects and the derivative objects that are related to the command, and     obtaining the data relating to the command structures from the class objects and the derivative objects that are related to the command.

23. The method according to claim 21, wherein the step of traversing the associative graph portion further comprises:

using the association role file list and the terminal file list to traverse the associative graph portion.

24. A memory, comprising:

data storage; and a data structure encoded within said data storage representing a command with a combination associative and directed graph, said combination associative and directed graph including:

a directed graph portion used to represent and traverse command structures having a relationship to each other, said directed graph portion including data defining a coupling of said directed graph portion to and below the command;

an associative graph portion used to represent and traverse command structures each having a named role, said associative graph portion including data defining a coupling component coupling said associative graph portion to and below the command, wherein said coupling component is referenced by the directed graph portion.

25. The data structure according to claim 24, wherein the directed graph portion comprises a hierarchical directed command structure.

26. The data structure according to claim 24, wherein the associative graph portion comprises an associative command structure having an associative nature.

* * * * *